March 15, 1949.     M. V. FALKNER     2,464,638
AXIALLY SHIFTING TYPE TIRE STRIPPER
Filed July 7, 1945
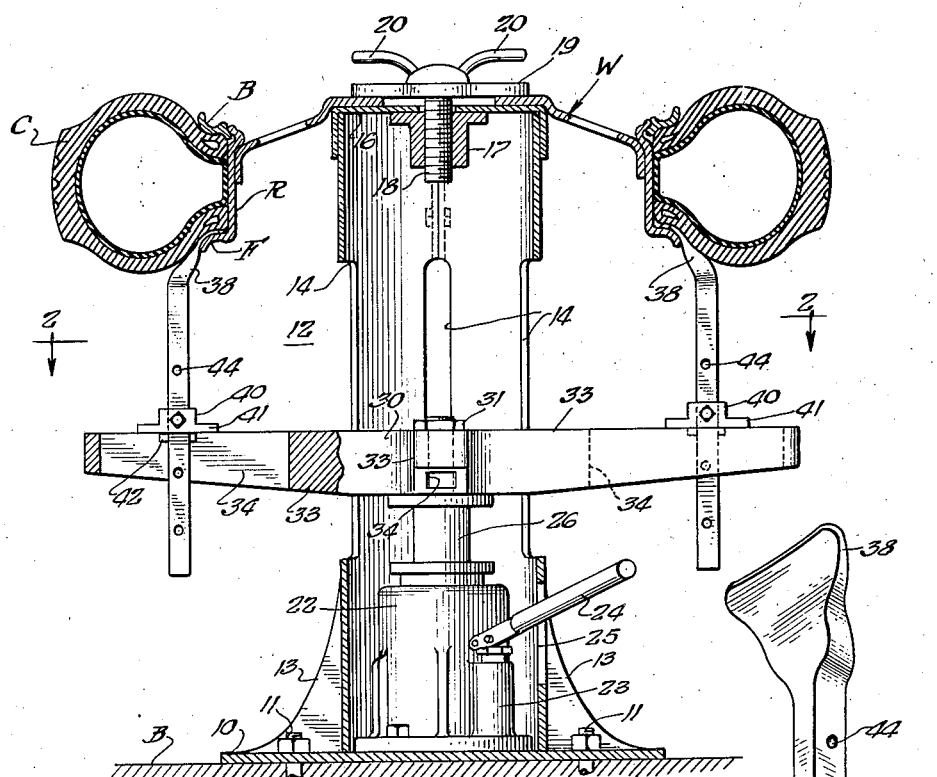
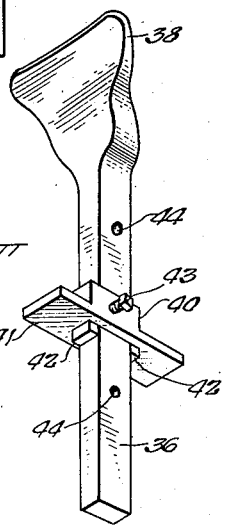
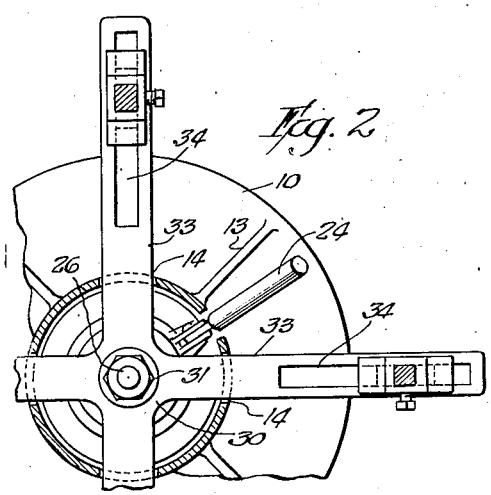
Myron V. Falkner
Inventor
By Smith & Tuck
Attorneys Patented Mar. 15, 1949

2,464,638

UNITED STATES PATENT OFFICE 2,464,638

AXIALLY SHIFTING TYPE TIRE STRIPPER

Myron V. Falkner, Arlington, Wash.

Application July 7, 1945, Serial No. 603,712

2 Claims. (Cl. 157—1.2)

This invention relates to an axially shifting type tire stripper and, more particularly, to a machine for stripping tire casings from the rims upon which they are mounted, usually with a very tight fit of such a degree that in the event of an accumulation of rust or dirt, they become effectively welded thereon.

In recent years, the use of the drop center wheel has become conventional for most passenger vehicles and for practically all trucks, trolleys, trailers, and the like. In such wheels, around the main hub and central portion thereof, is mounted the rim having an integral tire retaining flange on the one side and provided with a rim gutter and flange on the other side for the reception of a locking ring providing a removable tire retaining flange to be positioned opposite the integral flange. The removable ring flange is retained in the gutter usually by pressure exerted from within the casing when the same is inflated and is, ordinarily, easily removed when the casing is deflated. However, where there is no need for removing the casing for long periods of use, it is customary for these ring flanges to become fused to the rim and within the gutter and they also present a real problem when the tire must be slipped from the rim so as to repair the same or its inner tube.

In the past, various devices have been provided for manipulating the casing with respect to the rim, and vice versa, but it is my experience that they are either too complicated or require too much attention and skill on the part of the operator to be fully satisfactory. In addition, these devices have usually been adapted to accommodate tires within a limited range of diameters and not fully useful for the many different sized tires normally brought to a repair shop for service.

Having in mind the defects of the prior art of tire stripping tools, it is an object of my invention to provide a tire stripper that is capable of efficient use by unskilled persons without requiring customary instruction and without requiring great manual strength on the part of the operator.

Another object of my invention is the provision in a device of the type described, of means which are few and simple, but durable, that are easily assembled or disassembled for use in servicing tires and which device is equally easy of adjustment for the accommodations of tires of varying diameters and having various sized casings.

A still further, and more specific, object of my invention is to provide in a tire stripper of the type described an arrangement of parts wherein the work to be done is capable of performance at waist heighth and entirely within the view of the operator, both for his convenience of observation and progress as well as to preclude unnecessary bending over wherein he is placed at a physical disadvantage.

The foregoing objects and those ancillary thereto, I prefer to ansfer as follows:

According to a preferred embodiment of my invention, I provide a column adapted to stand upright on a floor or the like. The capital of the column receives the hub of the wheel to be stripped of its casing and clamp means are associated with the capital so that such wheel may be securely locked upon the column. The column has upright slots, usually four in number, symmetrically arranged in the sidewalls, and from a head centrally located and vertically reciprocal in the column, arms extend outward through the slots to carry upright pusher members which, when the head and its arms are elevated, press upon the casing of a wheel anchored upon the column and forcibly raise it or slide it off the wheel rim. In a preferred form of my invention, the arms just described are slotted radially of the head and the pusher members may be mounted therein at various distances from the center of the head, thereby to accommodate the various diameters of wheels and casings. To facilitate mounting the pusher members in the slotted arms, I employ a bushing in which the pusher member may be locked at various vertical heighths and which bushing is adapted for sliding movement in the slotted arms. Within the casing and below the reciprocal head is provided a means for raising and lowering the head. I prefer, for this purpose, to employ a hydraulic jack having intimately associated therewith pump and reservoir means and adapted for manual operation by a handle extending outward through the wall of the column where it will be located for manual manipulation. When the piston of the hydraulic jack is extruded upwards, the head, its arms, and the pusher members are also moved upward with force whereupon the spade-like ends of the pusher members insert themselves between the casing and the integral retaining flange of the wheel rim and apply pressure to the casing to strip it from the rim.

The novel features that I consider characteristic of my invention are set forth with particularity in the appended claims. The invention itself, both as to its organization and its method of operation, together with its additional objects and advantages, will best be understood from the following description of a specific embodiment when read in connection with the accompanying drawings, in which:

Figure 1 is a vertical sectional view through my tire stripper showing a wheel mounted thereon;

Figure 2 is a plan view with parts shown in section as though taken on line 2—2 of Figure 1; and Figure 3 is a perspective view of the pusher member and its bushing.

A tire stripping device, to overcome the defects hereinbefore enumerated, must have at least two totally distinctive characteristics: it must be capable of accommodating a wide range of sizes of tires; and it must also provide means which will overcome the greatest possible tendency of the tire casing to adhere to the rim with but a minimum of manual skill and force. Accordingly, a preferred embodiment of my invention, as will be seen in Figure 1, comprises the base plate 10 adapted to be secured to a base B by means of bolts 11, 11, and supports the upright column 12 with the assistance of fillets 13, 13. The column 12 is hollow and has upright slots 14 arranged symmetrically for a purpose later to be described. The upper end of the column is closed by a cap 16 which serves as a hub-receiving table for the hub of a wheel W.

On the under side of cap 16 is securely mounted a nut 17 for the reception of the screw 18 of the clamping head 19 which, in cooperation with the upper surface of cap 16, grips both faces of the hub of the wheel W. Handles also permit the operator to turn the screw 18 for the clamping operation.

Within the column 12 is mounted a hydraulic cylinder 22 having a pump 23 and handle means 24 for actuating the pump, the latter extending outwardly through the column through an opening provided therefor. When the handle 24 is pumped periodically, amounts of fluid are forced under a piston within the jack 22 to extrude upwardly the piston rod 26. Suitable fluid release and by-pass means of conventional nature is employed in the jack 22 when it is desired to let the piston rod recede into the jack.

A head 30 is secured to the upper end of the piston rod by means of the nut 31 and from this head extends a plurality of arms 33, one passing through each of the slots 14. Each of the arms 33 is slotted at 34 to receive the shank 36 of an upstanding casing presser member which has a spade end 38. The presser member is held in adjusted vertical position in the slot 34 by means of the bushing 40 having end flanges 41 and lugs 42, on the under side. A set screw 43 passes through a wall of the bushing into suitably located holes 44 in the shank 36.

When the wheel W, here shown as being of the drop center type, is mounted upon the column 12, its rim R will be positioned so that the integral flange F is downward and the removable flange ring B is upward. The casing will be associated with the rim in the usual manner and the beads thereof positioned within the flanges F and B.

The operator, in the usual manner, will remove the flange B and will raise the head 30 and the arms 33 sufficiently that the spade ends 38 of the presser members will be inserted between the flange F and the casing C. As additional raising pressure is applied to the presser members, they will tend to raise the casing in the flange F and to slide it relative the rim R in a stripping action. The wheel will, of course, be held immovable by reason of its being clamped on the upper end of the column.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A stripper for a wheel-mounted deflated tire casing, comprising: a hollow column having upright slots therein forming guide-ways, a head movable within said column and having arms each co-extensive in width to a slot and each extending through a slot to be thereby guided during movement, clamp means at the top of said column to axially grip a wheel at its hub portion, means carried by each said arm to press on a tire casing on a wheel secured to said column top, and means for forcibly raising said head, its arms and the tire casing pressing means.

2. A stripper for a wheel-mounted deflated tire casing, comprising: a hollow column having upright slots therein forming guide-ways, a head movable within said column and having an arm extending through each slot to be thereby guided upon movement, each said arm being slotted radially of said head, clamp means at the top of said column to axially grip a wheel at its hub portion, means carried by each said arm and slideable in the slot thereof to press on a tire casing on a wheel secured to said column top, and means for forcibly raising said head, its arms and the means to press on a tire casing.

MYRON V. FALKNER.

REFERENCES CITED

The following references are of record in the file of this patent:

UNITED STATES PATENTS

| Number | Name | Date |
|---|---|---|
| 1,564,496 | Staugaard | Dec. 8, 1925 |
| 1,724,813 | Weaver et al. | Aug. 13, 1929 |
| 2,027,626 | Bernhard | Jan. 14, 1936 |
| 2,043,169 | Hawkinson | June 2, 1936 |
| 2,081,402 | Krema | May 25, 1937 |
| 2,228,086 | Rodgers | Jan. 7, 1941 |